UNITED STATES PATENT OFFICE 2,498,186

PURIFICATION OF CERTAIN ALKALINE EARTH HALIDES AND CRYSTAL PRODUCTS THEREOF

Donald C. Stockbarger, Belmont, and Arthur A. Blanchard, Brookline, Mass., assignors, by mesne assignments, to Research Corporation, New York, N. Y., a corporation of New York No Drawing. Application December 28, 1944, Serial No. 570,220

7 Claims. (Cl. 23—88)

This invention relates to the procuring from molten material, of strong bodies of perfect transparency of desired size, and especially, of material having valuable optical properties and utilities. The invention is particularly concerned with the provision of a method of removing impurities from a member of the group consisting of alkaline earth metal fluorides and magnesium fluoride preparatory to the production from the resulting purified fluorides of large bodies or crystals having especially desirable optical properties from the standpoint of freedom from light scattering. It is concerned, also, with the provision of large optically useful homogeneous bodies of certain fluorides, namely, calcium fluoride, magnesium fluoride, strontium fluoride and barium fluoride, which bodies are free from light scattering.

When a large body or crystal is grown from a melt of any one of the above named fluoride salts, the resulting body may, and invariably does, unless the precautions here disclosed are taken, contain inclusions of particles of impurities, which inclusions cause disadvantageous light scattering on the part of the optical element formed from such body or crystal. As little as one one-thousandth of one percent of some impurities may cause an objectionable amount of light scattering.

As a source of material for the melts the natural minerals or artifically prepared materials may be used. The minerals are very likely to contain such deleterious substances as sulphides, sulphates, silica, oxides, and others, all of which will segregate from the melt in inhomogeneous particles and cause scattering or will give rise to substances which will segregate in inhomogeneous particles and cause scattering. Artifically prepared fluorides can be obtained free from all deleterious impurities save water, but water gives rise, during the melting process, to oxides by the process of hydrolysis. Thus for example if we are dealing with artifically prepared calcium fluoride, contact with air containing water vapor cannot be avoided during handling, and minute amounts of water vapor will be adsorbed on the surface of the particles of the powdered material. At high temperature, approaching the melting point this adsorbed water effects almost quantative hydrolysis $$CaF_2 + H_2O = CaO + 2HF$$

and the calcium oxide thus formed being relatively insoluble in calicum fluoride will separate in particles which cause light scattering.

It is an object of the present invention to provide a method for purifying alkaline earth metal fluorides and magnesium fluoride whereby to make possible the formation, from the fluorides, of large crystalline bodies which are free, or substantially free, from light scattering. Another inventive object is the provision of alkaline earth metal fluorides and magnesium fluoride free from components which would cause light scattering. A further object of the invention is to provide a large crystal of an alkaline earth metal fluoride or magnesium fluoride characterized by freedom from light scattering.

We have discovered that the normally encountered deleterious impurities may be removed from alkaline earth metal fluorides and from magnesium fluoride by subjecting a melt of the fluoride to the action of a suitable scavenger such for example as lead fluoride which reacts with the impurities to form reaction products readily separable, as by volatilization, from the residual melt. Such scavenger, desirably a metal fluoride, should be volatile at a temperature a little below the fusion temperature of the alkaline earth metal fluoride or magnesium fluoride, as the case may be, and should be non-reactive with respect to the fluoride to be purified. We have found that lead fluoride is particularly useful as such scavenger.

The method of the invention, then, essentially consists in fusing the impure alkaline earth metal fluoride or impure magnesium fluoride with a scavenger and removing the reaction products produced by the scavenger as well as substantially all of the excess scavenger. The preferred scavenger, lead fluoride, however is soluble in calcium fluoride and a small excess would cause no deleterious segregation of particles.

In its preferred embodiment the method of the invention comprises effecting a thoroughgoing purification of the impure alkaline earth metal fluoride or impure magnesium fluoride by heating an intimate mixture of the latter and lead fluoride through temperatures at which the lead fluoride reacts and finally to a temperature at which the whole mass is molten and at which the excess lead fluoride and the products of the scavenging escape as vapors. The fluoride stock is thus left in condition for subsequent solidification. The following illustrates how the lead fluoride purifies or scavenges the melt.

The troublesome impurities are first of all calcium oxide from the hydrolysis of the calcium fluoride itself, and naturally occurring sulphides, sulphates and oxides including silica. With these the lead fluoride reacts to produce non-volatile calcium fluoride and such substances as lead oxide, lead sulphide and silicon fluoride. At the temperature of the furnace these latter substances, as well as the metal lead itself, are all sufficiently volatile to escape completely into the low pressure atmosphere maintained throughout the melting process.

The amount of lead fluoride to be employed is in part determined by the relative amount of impurities in the alkaline earth metal fluoride or magnesium fluoride; usually one to two (or more) per cent by weight of the lead fluoride addition is a sufficient amount. Because unreacted lead fluoride can be removed from the fluoride stock melt by volatilization, use of an excess of the scavenger is not critical.

For purifying natural fluorite, we prefer to crush the fluorite to small particle size, and to mix thoroughly with the crushed material an amount of lead fluoride sufficient to scavenge the impurities contained in the same, and to heat the resulting intimate mixture, contained in a graphite crucible, to a temperature approaching the fusion point.

The above recited method is effective not only for natural fluorite but also for synthetically produced calcium fluoride and for the fluorides of other metals, e. g., magnesium, strontium and barium. However, in the cases of the synthetically produced alkaline earth metal fluorides and magnesium fluoride, we prefer to co-precipitate a small amount of lead fluoride with the alkaline earth metal fluoride or magnesium fluoride, thereafter heating the resulting co-precipitate to reaction temperature as recited above. This procedure is illustrated in the following specific example of the production of a melt of pure calcium fluoride suitable for direct use in forming large crystals free from light scattering.

*Example*

100 parts by weight of C. P. calcium carbonate and 4 parts by weight of C. P. lead carbonate were mixed, and the mixture was suspended in 3 liters of water in a pure lead bucket. The "C. P." calcium and lead carbonate contained no deleterious impurities other than adsorbed water. To the aqueous suspension there was added, with stirring, an amount of C. P. hydrofluoric acid solution corresponding to 60 parts by weight of the acid. The resulting reaction mixture was allowed to settle and the supernatant liquor decanted off. A little more concentrated hydrofluoric acid was added and the mixture was evaporated to dryness. It contained about 4% by weight of lead fluoride; a small amount of adsorbed water and calcium fluoride constituted the remainder. The dry co-precipitate was transferred to a graphite crucible, and, in the latter, was heated to fusion in an electric furnace. As the co-precipitate approached the melting point volatile products escaped. A colorless, clear melt of purified calcium fluoride remained.

The so-purified melt of calcium fluoride thereafter was allowed to cool in the vacuum furnace and formed into a large crystalline body as described in U. S. Patents Nos. 2,149,076 and 2,214,976 to Donald C. Stockbarger, one of the joint applicants herein. The crystal was of optical quality and free from inclusions causing light scattering; it was suitable for the direct shaping therefrom of a lens or prism.

Lenses, prisms and other optical elements made from calcium fluoride crystals which have been produced artificially by our complete process are characterized by great clarity, freedom from color, freedom from inclusions of foreign matter such as pyrites and liquids, freedom from sources of directional light scattering and freedom from cracks and are further characterized by maximum dimensions which are unusually great and which are not limited by any known factor or condition. On the other hand, optical elements made from natural calcium fluoride, known as fluorite, are necessarily small or else are characterized by objectionable defects such as color, inclusions of foreign matter, sources of directional light scattering and cracks because only relatively small bodies of the mineral fluorite free from such defects are available. Optical elements made from calcium fluoride crystals produced artificially by our general process but without aid of scavenging are commonly characterized by directional light scattering which renders them unsuitable for optical use because the function of an optical element is to control the direction of light transmission as in lenses and prisms or to transmit light without deviation as in windows of cells designed for the determination of light absorption by a liquid or gas or else to transmit light diffusely which is impossible if directional scattering takes place. It is evident to anyone skilled in the art of optics that optical materials must be homogeneous, continuous and free from influence on the direction of light transmission other than index of refraction at any given wave-length and that sources of unwanted color and any other obstructions to the passage of light of any wave-length are objectionable.

Scavenged magnesium, strontium, and barium fluoride of the same high purity can be, and have been, produced by the method recited in the above specific example, a corresponding amount of C. P. magnesium, strontium, or barium carbonate being substituted for the calcium carbonate of said example.

Magnesium fluoride appears to be especially useful as a window material transparent to ultraviolet radiation of wave-lengths as short as 1130 Angstroms or less.

Barium and strontium fluorides are useful as prism materials transparent to infrared radiation of wave-lengths as long as $12\mu$ and $10.5\mu$ respectively or longer.

Barium fluoride optical elements of the present invention transmit ultraviolet radiation to 1350 Angstroms and less wave-lengths, while strontium fluoride elements transmit ultraviolet radiation to 1320 Angstroms and less wave-lengths. Calcium fluoride optical elements of the present invention transmit ultraviolet radiation to 1240 Angstroms and less wave-lengths, and are transparent to infrared radiation of $9\mu$ and longer wave-lengths. Magnesium fluoride optical elements of the present invention transmit ultraviolet radiation to 1130 Angstroms and less wave-lengths.

Barium fluoride can be used advantageously in combination with glass or other optical material in the fabrication of lenses which are relatively free from chromatic aberration, and strontium fluoride can be substituted for barium fluoride in said combination for said purpose.

We claim:

1. Method of preparing a melt of pure fluoride salt of the group consisting of alkaline earth metal fluorides and magnesium fluoride, which comprises co-precipitating the fluoride salt and a small amount of lead fluoride, substantially drying the co-precipitate, heating the latter to a temperature at which lead fluoride reacts with impurities in the co-precipitate and sufficient to melt the co-precipitate and for a period of time sufficient to volatilize reaction products other than said fluoride salt, and separating such reaction products from the residual fluoride melt.

2. Method as defined in claim 1 in which the coprecipitated salts are formed by adding hydrofluoric acid to an aqueous suspension of the carbonates of the metals.

3. Method of purifying a member of the group consisting of alkaline earth metal and magnesium fluorides containing a small amount of an impurity normally associated with said member, which comprises heating a mixture of said member with a small amount of lead fluoride to a temperature and for a time sufficient to react the lead fluoride with said impurity to form a volatile reaction product, to melt the mixture, and to vaporize said reaction product and any unreacted lead fluoride, and separating the vaporized reaction product and lead fluoride from said member.

4. As a new product, an optical element shaped from a larger artificial crystalline body consisting of a single large crystal of a compound of the group consisting of alkaline earth metal and magnesium fluorides said crystal containing less than one one-thousandth of one percent of solid particulate impurities, and being free from light-scattering properties, cloudiness, color, cracks, fissures and products of hydrolysis, and being produced by cooling a molten melt of the fluoride which has been purified by carrying out the process of claim 3.

5. The product defined in claim 4, in which the fluoride is barium fluoride and in which the crystal is transparent to ultra-violet radiation of 1350 Angstroms and less wavelengths and to infrared radiation of wavelengths as long as $12\mu$ and longer.

6. The product defined in claim 4, in which the fluoride is magnesium fluoride and in which the crystal is transparent to ultra-violet radiation of 1130 Angstroms and less wavelengths.

7. The product defined in claim 4, in which the fluoride is strontium fluoride and in which the crystal is transparent to ultra-violet radiation of 1320 Angstroms and less wavelengths and to infrared radiation of wavelengths as long as $10.5\mu$ and longer.

DONALD C. STOCKBARGER.
ARTHUR A. BLANCHARD.

REFERENCES CITED

The following references are of record in the file of this patent:

UNITED STATES PATENTS

| Number | Name | Date |
| --- | --- | --- |
| 2,301,456 | Sabine | Nov. 10, 1942 |

OTHER REFERENCES

"Optical Fluoride in Southern Ill.," by Joseph E. Pogue, Univ. of Ill., State Geol. Surv., 1918, pages 419–424.

U. S. Dept. of Commerce, Bureau of Mines, Bulletin 244, Fluorspar, Its Mining, Milling, etc., by Raymond B. Ladoo, 1927, pp. 14, 63, and 67–71.

Mellor, "Comprehensive Treatise on Inorganic & Theoretical Chemistry," Longmans, Green & Co., N. Y., publishers, vol. 3, pages 688–689; vol. 4, pages 296–297.